Figure 1:
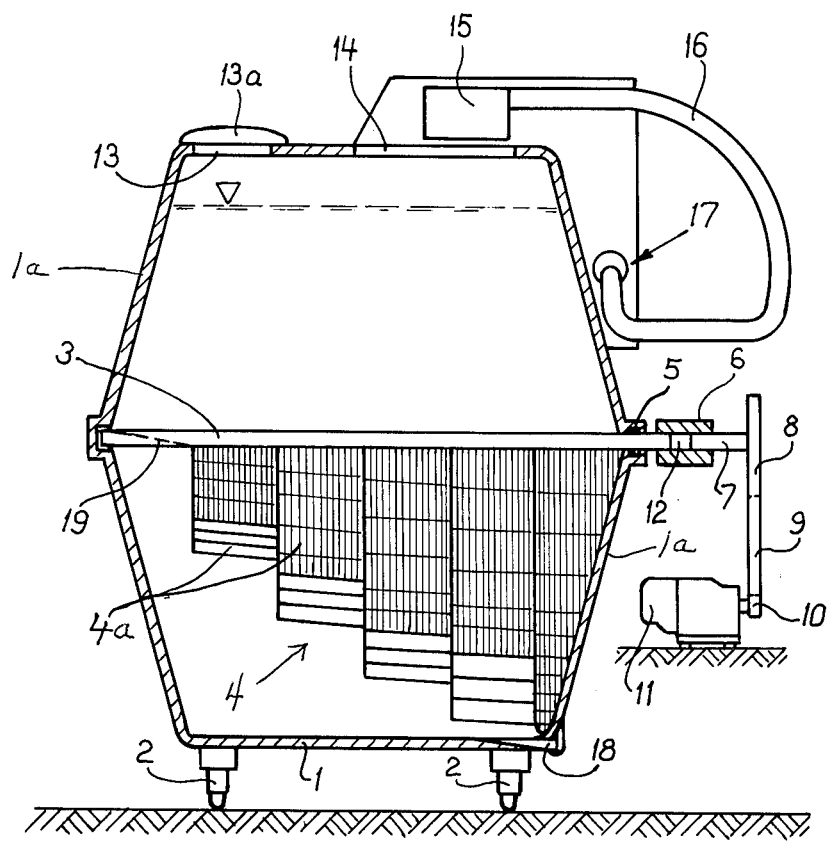

United States Patent [19]

Sjoholm et al.

[11] 4,108,058

[45] Aug. 22, 1978

[54] CHEESE-MAKING APPARATUS

[75] Inventors: Claes Bertil Sjoholm, Malmo; Karl J. G. Martensson, Lund, both of Sweden

[73] Assignee: Alfa-Laval AB, Tumba, Sweden

[21] Appl. No.: 676,070

[22] Filed: Apr. 12, 1976

[30] Foreign Application Priority Data

Apr. 18, 1975 [SE] Sweden ............................ 7504503

[51] Int. Cl.$^2$ ............................................ A10J 25/06
[52] U.S. Cl. ........................................ 99/466; 99/459; 366/325
[58] Field of Search ................. 99/452, 456, 458–463, 99/465–466; 259/9, 25, 45, 109

[56] References Cited

U.S. PATENT DOCUMENTS

| 3,829,594 | 8/1974 | Schweizer | 99/460 |
| 3,858,855 | 1/1975 | Hazen | 99/462 |

FOREIGN PATENT DOCUMENTS

| 1,255,470 | 1/1960 | France | 99/459 |
| 442,928 | 12/1924 | Fed. Rep. of Germany | 259/45 |
| 104,769 | 1942 | Sweden | 99/466 |
| 123,952 | 1/1946 | Sweden | 99/466 |

Primary Examiner—Harvey C. Hornsby
Assistant Examiner—Robert Pous
Attorney, Agent, or Firm—Cyrus S. Hapgood

[57] ABSTRACT

An immobile container for the cheese curd is in the form of a body of revolution having a substantially horizontal axis; and a tool which is rotated by a drive shaft about the container axis is arranged to cut and stir curd situated above as well as below the container axis. The tool preferably has several side-by-side sections extending from the drive shaft to the surrounding wall of the container and forming an angle with each other, each section having spaced cutting members and also having swingable flaps movable to and from positions in which they cover at least parts of the interspaces between the spaced cutting members.

16 Claims, 5 Drawing Figures

CHEESE-MAKING APPARATUS

This invention relates to apparatus for making cheese and more particularly to an improved cheese-making apparatus of the type in which the curds are cut and stirred in a container.

Conventional apparatus for cheese-making usually comprises a so-called cheese vat constituted by either a standing cylinder or an elongated open container. In French Pat. No. 1,549,566, there is shown a cylindrical cheese vat provided with automatic tools for cutting and subsequent stirring of cheese curd. In German Pat. No. 1,052,150, there is shown an elongated cheese vat provided with tools for the same purpose.

In the past, elongated open cheese vats were often used, these vats being provided with a plane bottom. In the production of certain kinds of cheese, vats of this kind were used not only for the curdling process but also for an initial compressing of the cheese curd obtained during the curdling process. Before the curd was removed from the cheese vat, it was compressed at the bottom of the cheese vat until only a minor amount of whey remained in it. The compressing of the cheese curd normally took place while whey was still in the cheese vat, i.e., it took place below the surface of the whey, since whey has less density than ready cheese curd. It was thus necessary in these cases to have open cheese vats in order to easily enable a compression of the cheese curd in this manner, and also to enable removal of the cheese curd from the cheese vat after the compressing operation. The reason for making the cheese vats elongated instead of cylindrical is believed to be that the cheese curd was more easily accessible in an elongated cheese vat than in a cylindrical one having the corresponding volume.

Eventually, other methods were devised for pressing of cheese curd, and cheese-making apparatus of the kind shown in said French patent came to be used. From the large cylindrical cheese vats then being used, the cheese mass was removed (after finished curdling) through an outlet at the bottom of the cheese vat. In certain cases whey was removed through a whey sieving means arranged, for example, to be immersed into the cheese vat from above.

After modern apparatus of this kind has been devised, the old kind of elongated cheese vat was used more and more seldom. The reason is mainly that cheese vats of this kind are not as suitable for automatic operation of cutting and stirring tools as cylindrical cheese vats. Further, they are not as suitable for automatic cleaning of the entire cheese-making equipment.

Modern cheese-making apparatus of the kind shown in the said French patent has some disadvantages, however. The most essential of these is that the apparatus has a very complicated construction and, therefore, is very expensive. Particularly, the means of the apparatus for driving the cutting and stirring tools has a complicated construction. The reason for this complicated construction stems from the fact that for practical reasons it is not possible to exceed a certain depth in a cheese vat. The cutting of the cheese curd as well as the subsequent stirring of the cut cheese grains are made more difficult the deeper a cheese vat is made. Therefore, if it is desired to maintain a cylindrical form of the cheese vat when the cheese vat is to be made larger, the diameter of the cheese vat must be made larger. However, a large diameter imposes heavy requirements on the cutting and stirring tools and also on the means for their driving. In accordance with the French patent, the cheese-making apparatus has therefore been provided with two cutting and stirring tools which are rotatable both around a common axis (i.e., the axis of the cheese vat) and around separate axes situated at some distance from said common axis. The means for creating these so-called planetary movements of the tools are extremely expensive.

A further expensive complication in connection with a large cylindrical cheese vat, in which two tools are rotatable both around the axis of the cheese vat and around separate axes situated at some distance from the axis of the cheese vat, is that the cheese vat must be given a planar and strongly constructed bottom. If both of the tools are to effectively cut and stir the cheese curd in all parts of the cheese vat, the bottom of the cheese vat cannot be strengthened, as by having it made conical.

The principal object of the present invention is to provide a cheese-making apparatus comprising a container and a tool movable therein for cutting and subsequent stirring of cheese curd, which apparatus is simple and inexpensive and enables the use of very large curdling containers without the requirement of complicated and expensive means for the cutting and stirring operations.

This object is achieved according to the invention by a cheese-making apparatus comprising an immobile container for cheese curd, which container has the form of a body of revolution, preferably a cylinder, a tool movable within the container for cutting and subsequent stirring of cheese curd, and a drive shaft connected to the tool and arranged to rotate the tool around the axis of the container, the immobile container being arranged with its axis substantially horizontal, and said tool being arranged to cut and stir cheese curd situated above as well as below the container axis.

The present invention makes it possible to use very large curdling containers without resulting in the necessary means for cutting and stirring the cheese curd becoming substantially more expensive than in connection with small curdling containers. Thus, the size of the curdling container can be changed within a very wide range while maintaining an unchanged vertical depth in the container for the treated cheese curd. Only the size of the generated surface of the container, or the surrounding wall, must be increased or decreased in the axial direction of the container, a corresponding increase or decrease, respectively, of the axial length of the tool being necessary. No expensive structural change of the tool driving means is necessary. Further, the curdling tank need not have a strengthened plane bottom. The end walls of the curdling container preferably are made conical.

It should be mentioned that a cylindrical container with a horizontal axis has been previously proposed for curdling purposes. For instance, in the Swedish Pat. No. 104,769 granted in 1942, a cylindrical container of this kind is shown. However, this patent does not concern an immobile container with a tool rotatable around the axis of the container, but a rotatable container with a tool journalled in the end walls ou the container at some distance from its axis. The idea behind the apparatus disclosed in this Swedish patent is derived from a conventional apparatus for butter making (churning). It has never been reduced to practice in connection with cheese making, however, which may be due to the fact that it has a complicated construction. The development of cheese-making apparatus instead took another direction leading to arrangements in accordance with the above-mentioned French patent.

Within the scope of the present invention, the cutting and stirring tool may be constructed in different ways. In a preferred embodiment of the invention, the tool comprises at least one movable member which is arranged to take a position in response to relative motion between the cheese curd and the tool on rotation of the latter in one direction about the container axis, in which position it permits passage of cheese curd through the tool so that the cheese curd is cut, but which takes another position in response to relative motion between the cheese curd and the tool upon rotation of the latter in the opposite direction about the container axis, in which other position it at least impedes passage of cheese curd through the tool, so that stirring of the cut cheese curd is made possible.

In a particular embodiment, the tool comprises a number of cutting members, preferably knives with sharp edges turned in the same direction, which extend from the container axis to the surrounding wall of the container, and several swingable flaps arranged to move to and from positions in which they cover at least part of the interspaces formed between the cutting members.

Figure 2:
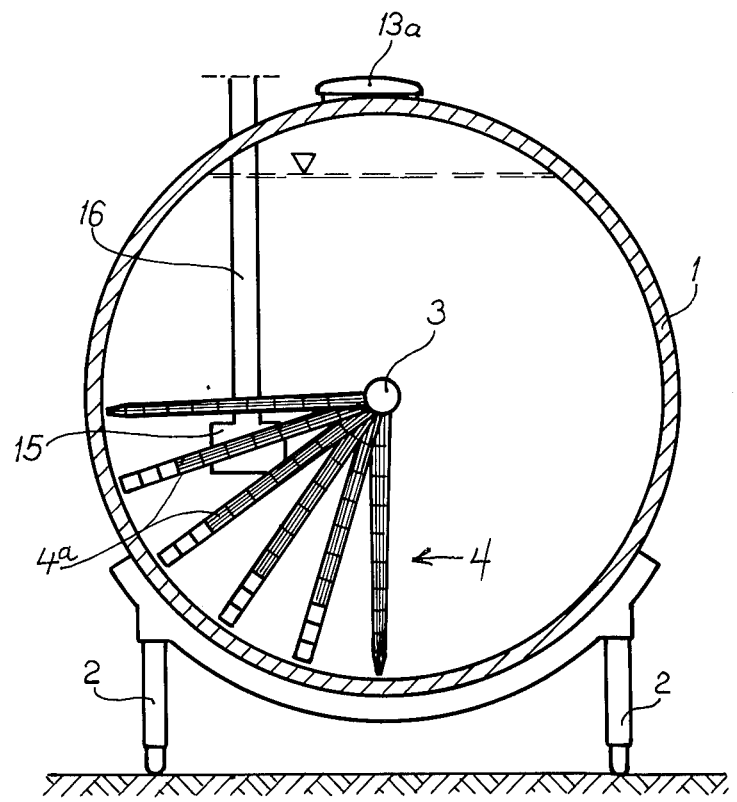
Figures 3, 4:
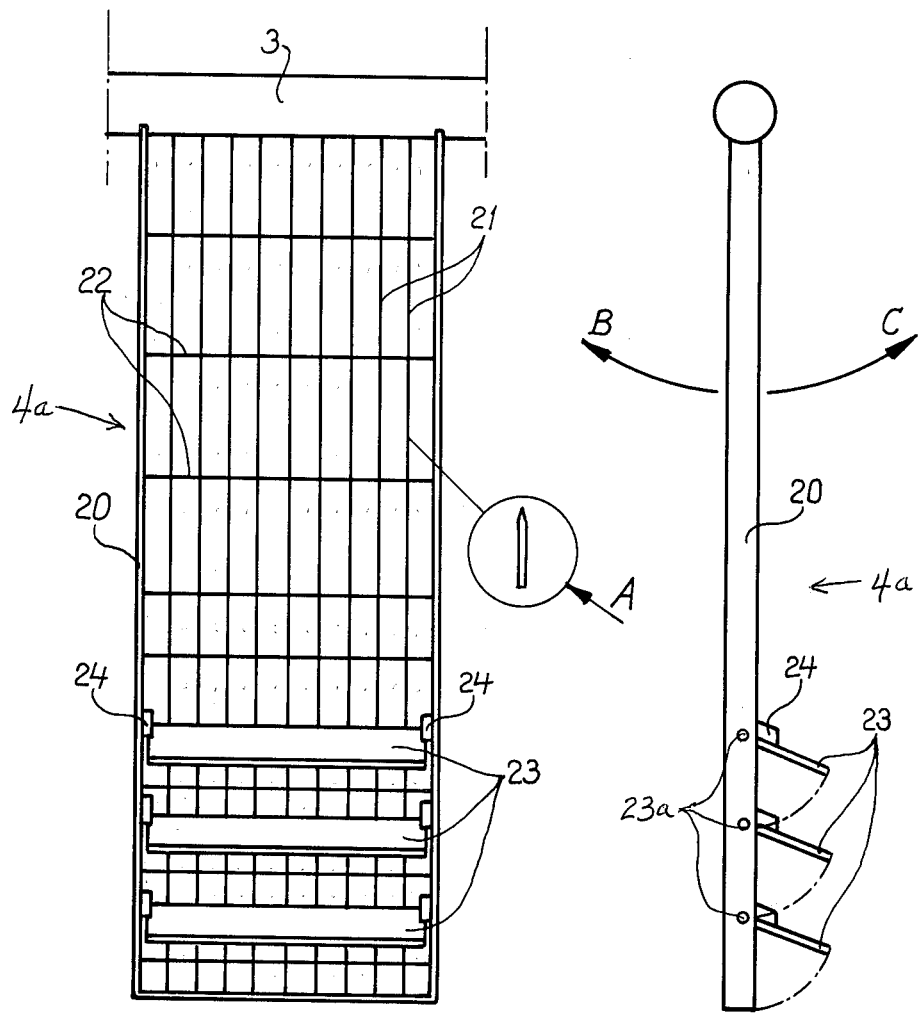
Figure 5:
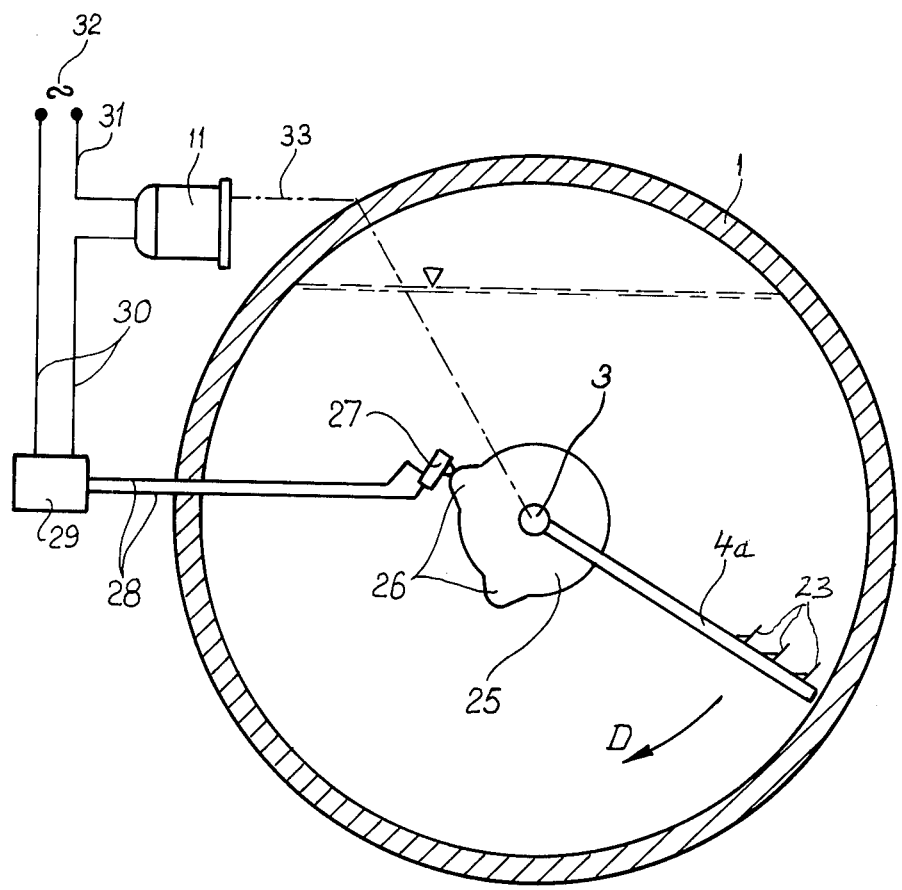

The invention is further described below with reference to the accompanying drawings in which FIG. 1 is an axial sectional view of a curdling container according to the invention; FIG. 2 is a cross-sectional view of the container, seen from the left in FIG. 1; FIGS. 3 and 4 are detail views of part of a tool for cutting and stirring cheese curd, and FIG. 5 is a cross-sectional view through the curdling container, seen from the left in FIG. 1, showing schematically certain means arranged to cooperate upon cutting of the cheese curd.

In FIGS. 1 and 2 there is shown a cylindrical curdling container 1 supported by a number of legs 2, so that the container axis extends substantially horizontally. A small inclination, about 2°, has been given to the container axis relative to a horizontal line, however, for reasons to be mentioned later. The end walls 1a of the container 1 are formed conically, and through one of these end walls a shaft 3 extends centrally into the container. This shaft, being journalled in the opposite end wall, supports a tool 4 for cutting and stirring of cheese curd in the curdling container. A seal 5 is provided between the shaft 3 and the wall through which the shaft 3 extends into the curdling container.

Outside the curdling container, the shaft 3 is connected by means of a coupling 6 to a short shaft 7, which supports a pulley 8. Through a belt 9, the pulley 8 is rotatably connected with another pulley 10 arranged to be driven by a motor 11. The motor 11 is reversible so that it can rotate the tool 4 about the axis of the curdling container 1 alternately in one direction and then the other. In the coupling 6 there is left a small interspace 12 between the shafts 3 and 7, so that when necessary the seal 5 can easily be replaced after removal of the coupling 6. For the sake of clarity, a supporting bearing for the shaft 7 has been omitted from the drawing.

The curdling container 1 in its upper part has a manhole 13 covered by a manhole cover 13a. A further opening 14 in the upper part of the container 1 is intended for immersion of a whey sieve 15 into the container 1. The whey sieve 15 is supported by a bent pipe 16 which at 17 is rotatably connected to the container 1. The whey seive 15 is rotatable between the retracted position shown in FIG. 1 and the immersed position shown in FIG. 2. The curdling container 1 at its lowest part has an outlet 18. The surface level of the cheese curd within the container is shown by a triangle.

The tool 4 is divided into several sections 4a which are situated side-by-side along the shaft 3, as can be seen from FIG. 1. In the illustrated embodiment, the tool consists of six sections 4a. The sections are connected with the shaft 3 in a way such that they form angles with each other, as can be seen from FIG. 2. In the illustrated embodiment, the sections are placed one after the other along the shaft 3 so that they extend outwards from the shaft like successive parts of a screw thread. The sections situated most remote from each other form an angle of about 90° with each other.

Each of the tool sections also forms an angle with the shaft 3, as is illustrated by a dashed line 19 in FIG. 1, which is intended to show the section situated most to the left and concealed by the shaft 3.

In FIGS. 3 and 4 there is shown a tool section 4a in detail. This comprises a frame 20 connected to the shaft 3 and supporting several knives each having a cross-section as shown at A in FIG. 3. Some knives 21 extend substantially perpendicular to the shaft 3, whereas other knives 22 extend substantially parallel with the shaft 3. At its part remote from the shaft 3, the frame 20 also supports three flaps 23. These flaps are swingably connected with the frame 20 through shafts 23a substantially parallel with the shaft 3, as can be seen from FIG. 4. The knives 21 and 22 limit the swinging movement of the flaps 23 in one direction, whereas separate stops 24 limit the swinging movement of the flaps in the other direction. The flaps 23 are situated on the rear sides of the knives 21 and 22, which sides are not sharp. In FIG. 4 an arrow B shows the direction of rotation of the tool section when cheese curd is to be cut, whereas an arrow C shows the rotational direction of the tool section when cheese curd is to be stirred.

In FIG. 5 there is shown schematically a cross-section of the curdling container 1 and one of the sections 4a of the tool 4 according to FIGS. 3 and 4. As can be seen from FIG. 5, the shaft 3 supports a cam member 25 connected therewith and having two cams 26. Adjacent the cam member 25 is a micro-switch 27 which, through a double connection 28, is connected with a control unit 29 containing a delay mechanism. The control unit 29 in turn is connected through connections 30 to the motor 11 (FIG. 1) and also to a current source 32. (The control unit 29 also is connected to a separate current supply not shown in FIG. 5.) The motor 11 is connected through a connection 31 to the current supply 32. A dash-dot line 33 in FIG. 5 represents the driving connection between the motor 11 and the shaft 3. The micro-switch 27 and the control unit 29 are arranged, during rotation of the tool 4 in the direction shown by arrow D in FIG. 5, to stop the rotation during short periods of time when the tool 4 is at predetermined positions within the curdling container 1. The cam member 25 and the micro-switch 27 may be mounted either within or outside the curdling container 1.

In the operation of the illustrated apparatus, when milk and additives situated within the curdling container 1 have coagulated, the motor 11 is started for the cutting of the cheese curd. The tool 4 and the cam member 25 are then caused to rotate in the direction of the arrow D in FIG. 5. When the first cam 26 is brought into contact with the micro-switch 27, the motor 11 will automatically be stopped. After a short period of time, the length of which is determined by the delay mechanism in the control unit 29, the motor 11 is again started, the tool then being rotated in the same direction as before, until the next cam 26 is brought into contact with the micro-switch 27. One further short stop in the rotation of the tool then takes place automatically. Any desired number of cams may be carried by the cam member 25.

While being rotated, the tool cuts thin annular pieces of the cheese curd, which pieces are coaxial with the curdling container. Each time the tool is put into motion, the edges of the knives 21 and 22 thus pass through the cheese curd, the latter then being entrained (to a larger or smaller degree) by the movement of the tool. The flaps 23 then are forced to take the positions shown in FIG. 5. When the tool is stopped and is kept still by the motor 11, the cheese curd which was put into motion by the previous movement of the tool will force the flaps 23 to swing to their opposite end positions, in which they lie substantially flat against the adjacent knives 21 and 22 and thus block part of the interspaces between the knives. Due to the surfaces of the flaps 23 being turned to their blocking positions and being somewhat inclined relative to the shaft 3 (see numeral 19 in FIG. 1), the cheese curd will acquire a small movement component in the axial direction of the container, whereby parts of the cheese curd rings which were cut by the tool knives will be axially displaced and will thus be cut to pieces by the knives during the next rotational movement of the tool.

When the cheese curd, after a number of revolutions of the tool 4, has been cut into small pieces, the direction or rotation of the tool is reversed. Manually or automatically the micro-switch 27 and the control unit 29 are simultaneously disconnected, so that the rotation can take place without interruption. During the resulting stirring of the cheese curd, more and more whey will gradually be released from the cut cheese curd. The cheese curd having greater density then the whey will at the end of the stirring operation take up only between 10 and 20 percent of the original volume of the cheese curd. During the stirring operation, the flaps 23 of the tool will (at least upon movements upwardly in the curdling container) abut against the rear sides of the knives 21 and thus partly block the interspaces between the knives. Cheese curd situated in the way of the flaps 23 will thus be elevated somewhat by the flaps and will gradually slide off the latter partly in the axial direction (away from the bottom outlet 18), depending on the inclination of the flaps relative to the drive shaft 3 of the tool.

After a certain time of agitation of the cheese curd, the motor 11 is stopped and then the whey sieve 15 is swung down into the curdling container to the position shown in FIG. 2. By means of a pump (not shown), a part of the whey is then pumped out of the curdling container, after which hot water is supplied to the curdling tank. The cheese curds are then further stirred a period of time and are then discharged from the curdling container through the bottom outlet 18. The small inclination of the curdling container facilitates the discharge operation.

If desired, the tool 4 may be caused to perform a pendulum movement, during the discharge of whey, outside the sector of its normal angle of rotation where the whey sieve is situated. For this purpose, the drive shaft 3 of the tool may be provided with one further cam member (not shown) similar to the cam member 25 in FIG. 5, and means for reversing the direction of rotation of the motor 11 at certain sensed positions of the tool. As can be seen from FIG. 2, it is possible, by having the tool 4 divided into sections which form an angle with each other, to immerse the whey sieve, during the whey discharge, below the level of the driving shaft 3 without causing the sieve to prevent agitation of the cheese curd at a higher level in another part of the curdling container (i.e., in this case at the opposite end of the curdling container).

Another advantage of having the tool 4 divided into sections 4a forming angles with each other is that the load to which the motor 11 must be subjected, in connection with agitation of the cut cheese curd, can be evenly distributed during a large part of the rotational movement of the tool; in other words, the flaps 23 of the tool need not elevate cheese curd simultaneously during their upward movements.

We claim:

1. Cheese-making apparatus comprising an immobile container for cheese curd, said container being in the form of a body of revolution having an axis, a tool movable within the container and having cutting means and separate stirring means for cutting and subsequent stirring of cheese curd, and a drive shaft connected with the tool and arranged to rotate the tool about said axis of the container, said apparatus being characterized in that the immobile container is disposed with its said axis substantially horizontal and that said tool is arranged to cut and stir cheese curd situated above as well as below said axis of the container, said apparatus comprising also driving means for rotating said shaft and tool through a plurality of revolutions during a cutting operation and then through another plurality of revolutions during a stirring operation.

2. The apparatus of claim 1, in which said drive shaft extends centrally into the container.

3. The apparatus of claim 1, in which said tool comprises at least one movable member arranged to take a first position in response to relative motion between the cheese curd and the tool upon rotation of the tool in one direction, said member in said first position permitting passage of cheese curd through the tool so that the curd is cut, said member being movable to a second position in response to relative motion between the cheese curd and the tool upon rotation of the tool in the opposite direction, said member in said second position at least impeding passage of curd through the tool so that stirring of cut curd is effected.

4. The apparatus of claim 1, in which the tool comprises a plurality of spaced cutting members extending from said axis to the surrounding wall of the container, and a plurality of swingable flaps movable to and from positions in which they cover at least parts of the interspaces between the spaced cutting members.

5. The apparatus of claim 4, in which each flap is dimensioned to cover parts of several interspaces between the spaced cutting members.

6. The apparatus of claim 4, in which the cutting members comprise knives having sharp front edges turned in one direction and having dull rear edges turned in the opposite direction, said flaps being located adjacent said rear edges.

7. The apparatus of claim 4, in which the flaps are located only at a part of the tool situated nearest the surrounding wall of the container.

8. The apparatus of claim 4, in which said spaced cutting members are parallel to each other, said flaps being swingable about axes extending substantially parallel to the axis of the container.

9. The apparatus of claim 8, in which the swinging axis of each flap is located at the part thereof situated nearest to the container axis when the flap is positioned to cover interspaces between the spaced cutting members.

10. The apparatus of claim 4, in which the flaps form surfaces inclined relative to the container axis.

11. The apparatus of claim 1, in which the tool comprises several sections each of which extends substantially from the container axis to the surrounding wall of the container, said sections being disposed side-by-side along the drive shaft and with adjacent sections forming an angle with each other, as viewed in a cross-section of the container, said angle being less than 90°.

12. The apparatus of claim 11, in which said sections extend from the drive shaft like successive parts of a screw thread.

13. The apparatus of claim 12, in which the two sections situated most remote from each other form an angle of about 90°.

14. The apparatus of claim 1, in which said cutting means include a series of elongated cutting members disposed in generally parallel spaced relation to each other to form interspaces between adjacent cutting members, said stirring means including a swingable flap movable to a first position in response to relative motion in one direction between the cheese curd and the tool, the flap in said first position permitting passage of curd through said interspaces so that the curd is cut, the flap being movable to a second position in response to relative motion in the opposite direction between the curd and tool, the flap in said second position at least impeding passage of curd through said interspaces so that stirring of the curd is effected, said driving means including means for interrupting said rotation in one direction during said cutting operation, thereby causing movement of the flap to said second position, the driving means also including means for rotating the shaft and tool in the opposite direction during said stirring operation, thereby causing the flap to assume said second position.

15. The apparatus of claim 14, in which the flap forms a surface inclined relative to said axis, whereby said relative motion in said opposite direction causes the flap in said second position to impart to the curd a movement component in the axial direction of the container.

16. Cheese-making apparatus comprising an immobile container for cheese curd, said container being in the form of a body of revolution having an axis, a combined cutting and stirring tool movable within the container about its axis and including separately movable members arranged, upon relative movement in one direction between the tool and the cheese curd, to take first positions wherein they allow curd to flow through the tool and become cut, said members being movable, upon relative movement in the opposite direction between the tool and the cheese curd, to second positions wherein they oppose flow of curd through the tool, a drive shaft connected with the tool and arranged to rotate the tool about said axis of the container, the immobile container being disposed with its said axis substantially horizontal and said tool being arranged to cut and stir cheese curd situated above as well as below said axis of the container, and driving means for rotating said shaft and tool through a plurality of revolutions during a cutting operation and then through another plurality of revolutions during a stirring operation.

* * * * *